H. CUTLER.
Harvester Cutter.

No. 112,692.

Patented Mar. 14, 1871.

WITNESSES

INVENTOR.

UNITED STATES PATENT OFFICE.

HENRY CUTLER, OF CENTRAL VILLAGE, CONNECTICUT.

IMPROVEMENT IN HARVESTER-CUTTERS.

Specification forming part of Letters Patent No. 112,692, dated March 14, 1871.

I, HENRY CUTLER, of Central Village, in the county of Windham and State of Connecticut, have invented a new and useful Improvement in Harvesters, of which the following is a specification:

Nature and Objects of the Invention.

My invention relates, primarily, to the cutters of mowing-machines, but is applicable also to other harvesters; and consists in combining with the finger-bar and outer guard-finger or shoe a shear-plate of peculiar construction, surmounting the outer guard-finger and acting in conjunction with the cutter at the outer end of the knife, the outer edge of which cutter is beveled on the under side, all as hereinafter described.

Description of the Accompanying Drawing.

Figure 1:
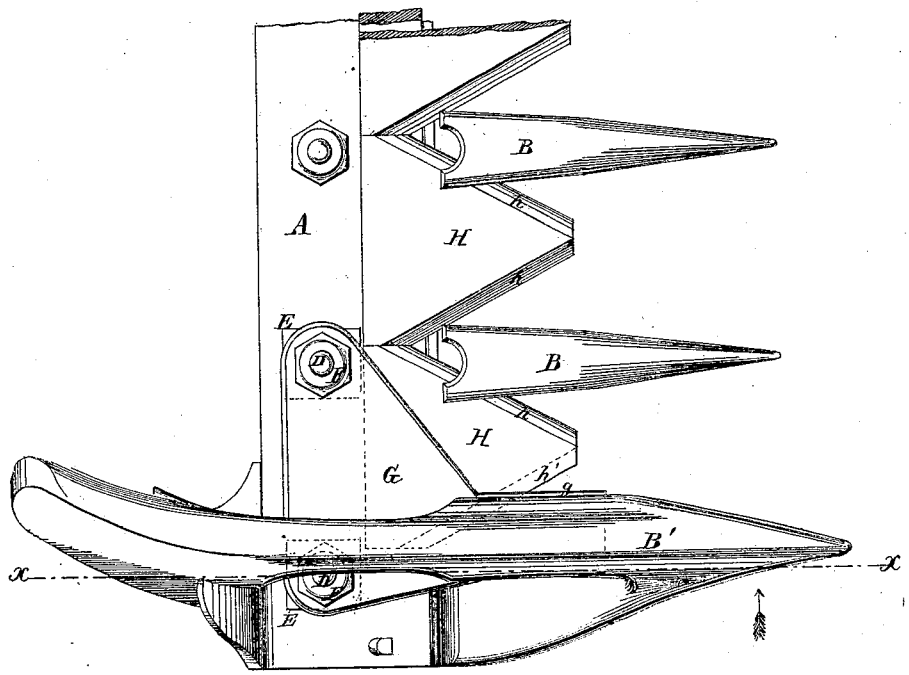
Figure 2:
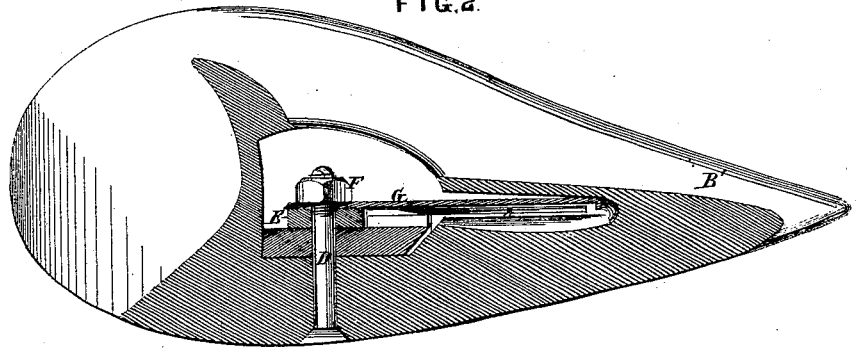

Figure 1 is a plan of the outer end of the cutting apparatus of a mowing-machine, illustrating my invention. Fig. 2 is a transverse section of the same at $x\ x$, Fig. 1.

General Description.

The finger bar or beam A and fingers B B' may be of any usual or suitable construction, B' being the outer or divider finger, attached to or cast in one piece with the shoe.

The bolts D D, which secure the two fingers at the outer end of the beam, receive above the bar, bolsters or thick washers E E, upon which, by means of nuts F F, the rear edge of my improved shear-plate G is securely clamped; or, if preferred, separate bolts may be employed to secure the said plate to the finger-bar. This shear-plate is constructed of steel or other suitable metal. Its forward part conforms nearly to the outline of the finger B', and bears with a moderate elastic pressure on the scythe H.

The outer edge of the outer cutter, $h'$, is beveled on the under side, as indicated by the dotted line, so as to adapt it to cut shearwise with the sharp edge $g$ of the plate G.

All the other cutters $h$ of the scythe, as well as the inner edge of the outer cutter, $h'$, are, preferably, beveled on the upper side, in the usual way.

Operation.

The shear-plate G acts as a gib or guide, and as a protecting-cap for the outer end of the scythe, and, in connection with the outer edge of the cutter $h'$, serves effectually to prevent the choking of the slot in the outer guard-finger or shoe by the accumulation of soft grass, which is liable to occur at that point beyond the end of the scythe.

My improved shear-plate, by its elasticity, bears with a moderate pressure upon the scythe, so as to cut constantly, and without fail, matters which might otherwise be carried within the slot, and at the same time it yields sufficiently to prevent its edge being cut away by that of the cutter, or vice versa.

One important characteristic of my invention is, that the shear-plate has, at its rear part, an extended bearing, and is rigidly attached to the finger-bar at two or more points; hence its forward part is not depended on for attachment, but is left entirely free.

My invention is adapted to be applied to any mowing-machine in use at a trifling cost, with no alteration in any part but in the cutter at the outer end of the scythe, which may readily be replaced by a new one having one edge beveled underneath, as I have described.

I am aware that A. Whitely, W. A. Kirby, and others have made scythes to cut on top, or with reversed edges, so as to cut both above and below. I do not therefore claim beveling a cutter on its under side, in itself considered.

I am also aware that Thos. D. Burrall, in the year 1853, proposed to apply a plate over the scythe; but this device was not practically adapted to effect the object of my invention, for the reason that it was not attached rigidly to the finger-bar behind the scythe, but was necessarily bolted to the shoe at a point where the latter, as proved by practical experience, is too narrow to receive a bolt and have sufficient strength.

Claim.

I claim as my invention—

The combination of the outer guard-finger or shoe, the outer cutting section beveled upon its under side, and the elastic shear-plate G, secured at its rear edge to the finger-bar, its forward part being left free and bearing with a yielding pressure on the cutter, all as herein specified.

HENRY CUTLER.

Witnesses:
 OCTAVIUS KNIGHT,
 WM. H. BRERETON, Jr.